United States Patent [19]

Jones

[11] 4,254,837

[45] Mar. 10, 1981

[54] TECHNIQUE FOR DAMPING OSCILLATIONS IN A DRILL STRING

[75] Inventor: Kenneth R. Jones, Corpus Christi, Tex.

[73] Assignee: Mustang Tripsaver Inc., Corpus Christi, Tex.

[21] Appl. No.: 29,524

[22] Filed: Apr. 12, 1979

Related U.S. Application Data

[63] Continuation of Ser. No. 849,718, Nov. 8, 1977, abandoned.

[51] Int. Cl.³ .............................................. E21B 17/00
[52] U.S. Cl. ..................................... 175/67; 175/321; 267/135; 267/162
[58] Field of Search .............. 267/135, 162, 137, 125; 64/23, 27 R; 175/321; 173/120

[56] References Cited

U.S. PATENT DOCUMENTS

| | | | |
|---|---|---|---|
| 3,301,009 | 1/1967 | Coulter, Jr. | 175/321 |
| 3,383,126 | 5/1968 | Salvatori | 175/321 |
| 3,853,188 | 12/1974 | Vasiliev | 175/321 |
| 3,963,228 | 6/1976 | Karle | 267/166 |

*Primary Examiner*—William F. Pate, III
*Attorney, Agent, or Firm*—G. Turner Moller

[57] ABSTRACT

There is disclosed a shock sub for incorporation in the lower part of a drill string for damping oscillations of the bit and drill string during drilling. The shock sub incorporates a spring assembly including a multiplicity of substantially annular ring springs that exhibit a spring rate of less than about 25,000 pounds per inch of deflection.

21 Claims, 8 Drawing Figures

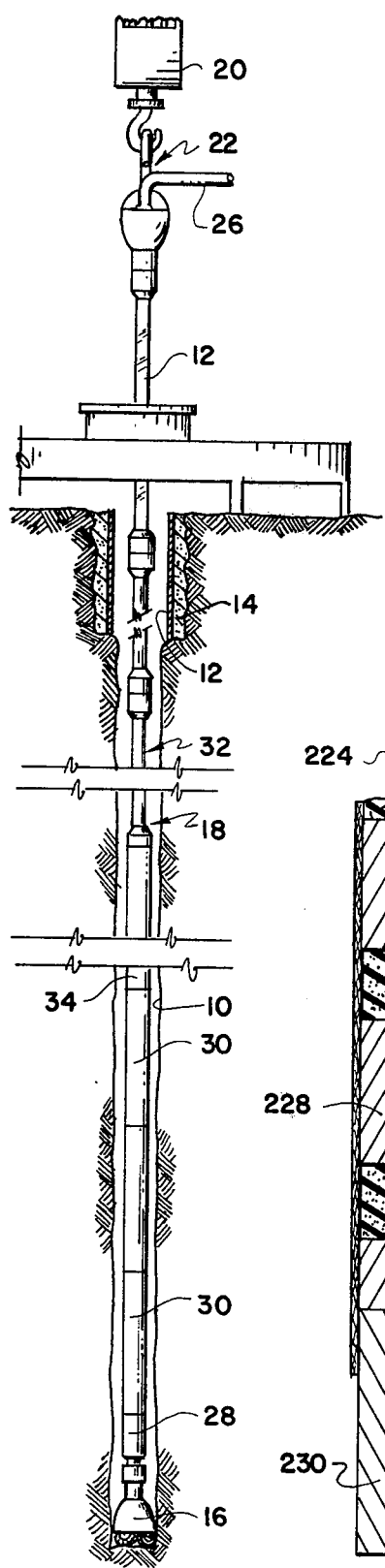
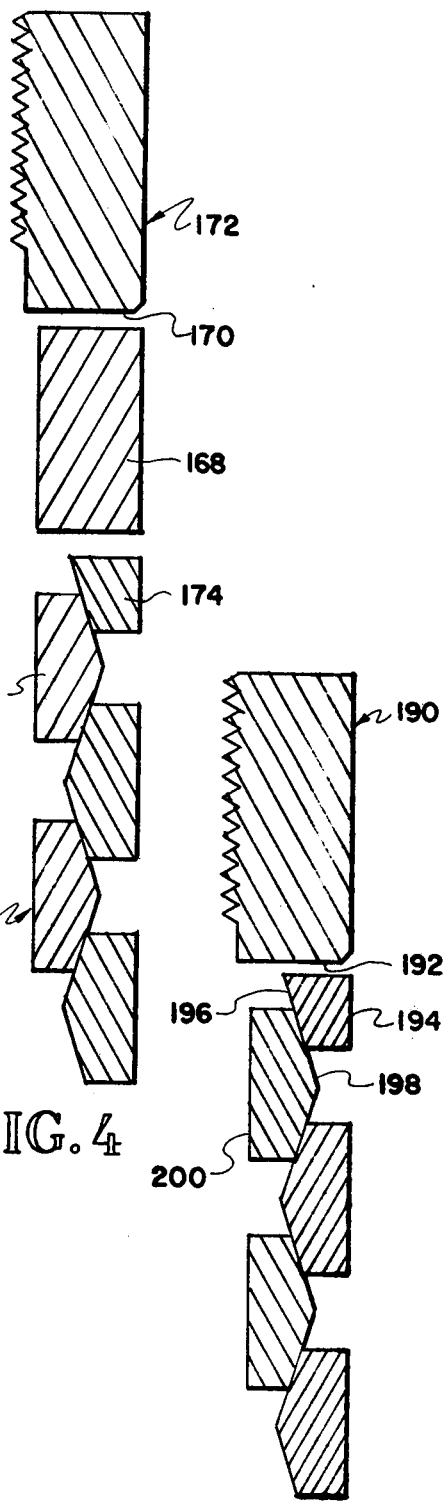
FIG. 1    FIG. 7    FIG. 4    FIG. 5

TECHNIQUE FOR DAMPING OSCILLATIONS IN A DRILL STRING

This is a continuation of application Ser. No. 849,718, filed Nov. 8, 1977 now abandoned.

This invention relates to shock subs for use in drill strings and methods of using the same.

It is well known in the art of drilling wells that the drill string and bit are subjected to substantial axial oscillations. As discussed in Down Hole Measurements of Drill String Forces and Motions, Journal of Engineering for Industry, May 1968, pages 217-225; Analysis of Down Hole Measurements of Drill String Forces and Motions, AIME Transactions, May 1968, pages 208-216; and Longitudinal and Angular Drill String Vibrations with Damping, Journal of Engineering for Industry, November 1968, pages 671-679, these oscillations are caused by pressure variations in the drill string, impact of bit teeth against the rock face being drilled, bit cone action against the rock face being drilled and rotation of the drill string. Under some circumstances, the oscillations can be so great as to cause the bit to move vertically off the rock face being drilled. Even in situations where the oscillations are not so severe, the oscillations can cause decreased bit tooth life, shortened bit bearing life, decreased fatigue life of the drill collars and drill pipe and shortened fatigue life of the derrick. It is accordingly not surprising that considerable effort has been spent on vibration damping devices for incorporation in a drill string.

Broadly, drill string shock subs comprise an outer barrel having a screw connection at one end, a mandrel telescopingly received in the barrel and having a screw connection at the opposite end, and a spring mechanism of some description operating between the barrel and mandrel. Spring mechanisms of wide variety have been suggested for use in shock subs. Exemplary spring designs include annular abutted metallic plates as shown in U.S. Pat. No. 2,570,577; helical springs as shown in U.S. Pat. No. 3,122,902; gas springs as shown in U.S. Pat. No. 3,230,740; pivoting metal sections as shown in U.S. Pat. Nos. 3,254,508 and 3,447,340; Belleville springs as shown in U.S. Pat. No. 3,871,193; and rubber or rubber-like springs as shown in U.S. Pat. Nos. 3,033,011; 3,099,918; 3,301,009 and 3,329,380.

The spring types in commercially available shock subs correspond broadly to the spring types illustrated in the patents cited above to the extent that there are available shock subs having gas springs, Belleville springs, rubber springs and helical springs. Each major type spring has substantial disadvantages. The gas springs exhibit a spring rate that varies in response to drilling depth as do some of the rubber spring devices. Although other of the rubber spring devices exhibit a constant spring rate with respect to depth, the spring rates are quite high, usually in the range of 90,000—120,000 pounds per inch of deflection. Although the helical springs exhibit a relatively low constant spring rate, e.g. 35,000 pounds per inch of deflection, this type tool is quite long which tends to destabilize the drill string. In addition, the helical spring is machined from a single piece of steel stock and is accordingly inherently expensive.

There are three interrelated design criteria which dictate the performance of a shock sub: load capacity, spring rate and deflection. It is suggested in the prior art that the lower the spring rate, the more effective will be the shock sub in damping vibrations as pointed out in the article entitled Longitudinal and Angular Drill String Vibrations with Damping, supra, and a publication of Johnston-Schlumberger, entitled "Shock Guard Drilling Shock Absorber." The load capacity of a shock sub is normally dictated by the maximum weight applied to the bit during drilling which is normally a function of bit diameter. Although the maximum weight applied to drilling bits varies somewhat, it is normally in the range of 6,000-9,000 pounds per inch of bit diameter. Load, deflection and spring rate in a mechanical spring assembly are related by the equation:

$$\text{Load} = (\text{Deflection/Spring Rate}) \tag{1}$$

Accordingly, when the load capacity is dictated by external circumstances, one can only decrease the spring rate of the system by increasing deflection.

Another design constraint to be reckoned with is the maximum diameter available for the spring. Because the nominal hole size is dictated by the size of the bit, it is self-defeating to contemplate utilizing a larger bit to give more tool area for two reasons. First, the industry will dictate the size bits to be used and the tool must be designed accordingly. Second, the larger the bit, the greater the load capacity required. There is, however, very little theoretical design contraint imposed on the axial length of the spring although it is desirable that the shock sub be as short as possible to maintain the drill collars as stable as possible.

To illustrate the problem, a typical bit size is 7 $\frac{7}{8}$" in diameter and accordingly has a maximum design weight applied thereto in the range of 47,000-70,000 pounds. Because there must be sufficient clearance between the external surface of the shock sub and the wall of the hole to allow cuttings and mud to pass therethrough, the maximum external diameter of the shock sub can be no greater than about 6$\frac{7}{8}$". The mandrel must have a conduit providing a passage for mud traveling downwardly to the bit of about the same size as the passage through the drill pipe and drill collars. In addition, the passage through the mandrel must be of sufficient size to receive a fishing spear. Accordingly, a passage in the range of 1$\frac{1}{2}$"—3" is required. It will accordingly be seen, using average values, that the barrel, mandrel and spring can occupy an annular area having an external diameter of about 6$\frac{7}{8}$" and an internal diameter of about 2$\frac{1}{4}$". Because a great deal of this area must be occupied by structural steel members comprising the wall of the barrel and wall of the mandrel, there is precious little design freedom in selecting the operating diameters of the spring mechanism installed between the mandrel and barrel.

Although the amount of weight applied to the bit is a function of diameter, normally the amount of weight and accordingly the load capacity of the spring assembly of this invention is in the range of 10,000-125,000 pounds. With more typically sized bits, the amount of weight and the load capacity is typically in the range of 30,000-75,000.

To further illustrate the effects of design constraint on the spring assemblies, it is believed that the 35,000 pound/inch spring rate of the helical spring in the shock sub offered by Johnston-Schlumberger probably represents a design which minimizesspring rate as far as practicable for the load capacity required of shock subs. In other words, it is believed impossible to design a practical helical spring having a substantially lower spring rate and providing the requisite load capacity and life expectancy within the constraints dictated by hole size, central passage size and tool length.

The shock sub of this invention is broadly organized to include an outer barrel having a screw connection on one end for connection to either the bit or the drill collars, a mandrel telescopingly received in the barrel and having a screw connection on the other end for connection in the drill string, and a spring assembly operating between the barrel and mandrel to damp relative movement between the barrel and mandrel. The shock sub is accordingly reversible in the sense that it can be run with the barrel connection down or with the mandrel connection down. As will be more fully pointed out hereinafter, a given shock sub of this invention has significantly different load capacities, because of the application of hydrostatic pressure inside the tool, when reversed.

The spring assembly in the shock sub is designed to provide a load capacity of 10,000–125,000 pounds and more typically has a load capacity of 30,000–75,000 pounds. The deflection of the spring is substantially less than twenty inches and the spring rate is less than 25,000 pounds per inch of longitudinal tool movement and is more desirably less than 15,000 pounds per inch of longitudinal tool movement.

The spring assembly comprises a multiplicity of annular inner springs having radially outer surfaces inclined to the axis of the shock sub and a multiplicity of annular outer springs having radially inner surfaces inclined to the axis of the shock sub. The inner and outer springs are stacked alternately in a chamber between the barrel and mandrel so that collapsing movement of the barrel and mandrel causes the springs to move axially toward each other. The inclined surfaces of the inner and outer springs engage during collapsing movement of the barrel and mandrel causing the outer springs to be stressed in tension and the inner springs to be stressed in compression substantially only in a multiplicity of planes perpendicular to the axis of the shock sub. The spring assembly of this invention accordingly utilizes what are sometimes called "ring springs" which are broadly known in the art as shown in U.S. Pat. Nos. 745,425; 1,598,228; 1,689,662; 1,700,133; 2,413,740; 2,515,346; 3,073,585; and 3,536,314 as well as in Characteristics of Ring Springs by Tyler G. Hicks, American Machinist, 1928, pages 192–195 and Mechanical Springs, First Edition, Arthur M. Wahl, Penton Publishing Co., 1944, pages 348–358.

It is an object of this invention to provide a shock sub which incorporates a ring spring assembly and a technique for using the same.

A further object of this invention is to provide a ring spring shock sub which provides an unusually low spring rate and an unusually high deflection.

Other objects and a fuller understanding of the invention may be had by reference to the following description taken in conjunction with the accompanying drawings and claims.

IN THE DRAWINGS

FIG. 1 is a sectional view through the earth illustrating the drilling of a hole therein by a drill string incorporating a shock sub of this invention;

FIG. 4 is a partial vertical cross-sectional view of the device of FIGS. 2A and 2B illustrating the replacement of a plurality of ring springs with an insert;

FIG. 5 is a view similar to FIG. 4 illustrating another technique for stressing the ring springs;

FIG. 7 is a partial vertical cross-sectional view of another embodiment of the invention.

Figure 2A:
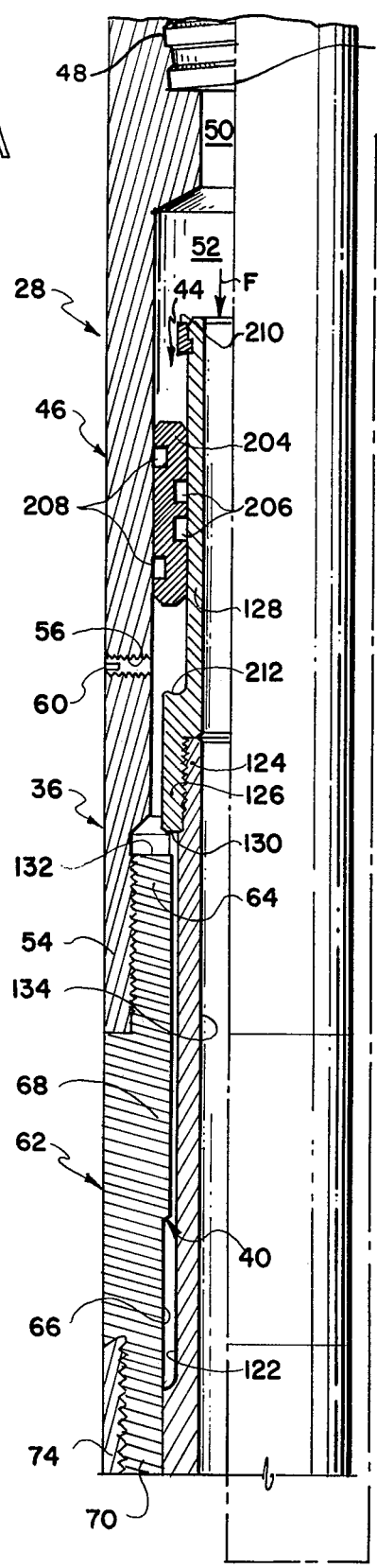
FIGS. 2A and 2B are partial longitudinal vertical cross-sectional views of the shock sub of this invention.

Referring to FIG. 1, there is illustrated a hole 10 being drilled in the earth through a string 12 of surface pipe placed therein and bonded to the earth by a cement sheath 14. The hole 10 is being drilled with a bit 16 connected by a drill string 18 suspended from a travelling block 20 by a conventional hook up 22 including a kelly 24. The travelling block 20 is suspended from a suitable crown block (not shown) provided by a suitable drilling rig (not shown). Drilling fluid is pumped through a mud line 26 into the drill string 18, exits through nozzles (not shown) in the bit 16 and then circulates upwardly through the annulus between the hole 10 and the drill string 18 to remove cuttings, cool and lubricate the bit 16, and control formation pressures as is customary in the art.

The drill string 18 comprises a shock sub 28 of this invention, a multiplicity of drill collars 30 and a string of drill pipe 32 illustrated as including a number of pipe joints having externally upset box and pin connections which are universally screw thread connections. The function of the drill string 18 is to conduct drilling fluid to the bit 16, to transmit torque to the bit 16, to stabilize the direction of drilling, to provide means for removing the bit 16 from the hole 10, and to apply weight to the bit 16. More specifically, the general function of the drill pipe 32 is to provide a mechanical and hydraulic connection to the drill collars 30. The drill collars 30 provide a mechanical and hydraulic connection between the drill pipe 32 and the bit 16 but also act to apply weight to the bit 16 and to stabilize the direction of drilling. The drill collars 30 are typically massive pipe joints providing a substantial amount of weight immediately above the bit 16 and are as inflexible as practicalities allow.

One of the early lessons in drilling with rotary drill pipe was that the bulk of the drill string 18 must be kept in tension with only the lower part of the drill collars allowed to be in compression in order to drill a relatively straight hole. Thus, the so-called neutral point 34 divides the drill string 18 into a relatively short lower section which is in compression and a relatively long upper section which is in tension. Accordingly, if it is desired to maintain 50,000 pounds of weight on the bit 16, it would not be unusual for the total weight of the drill collars 30 to be in excess of 100,000 pounds in order to compensate for the bouyancy of the drill collars 30 in the drilling fluid, to accomodate the reaction force of mud passing through the bit nozzles, and to maintain the neutral point 34 far below the top of the drill collars 30.

As pointed out previously and as discussed in great detail in the articles in the Journal of Engineering for Industry and in the AIME Transactions cited above, the drill string 18 is subjected to substantial axial oscillations during drilling. The data indicates that the provision of shock subs can substantially decrease the maximum amplitude of the oscillations, particularly at relatively high rotary speeds. In addition, the data indicates that a shock sub having a spring rate of 500,000 pounds per foot of deflection (41,668 pounds/inch of deflection) is as effective at low rotary speeds as a shock sub having a spring rate of 1,000,000 pounds per foot of deflection (83,333 pounds/inch of deflection) and is considerably more effective at higher rotary speeds. Because high rotary speeds are particularly desirable to achieve high penetration rates when drilling relatively hard formations, it is believed that shock subs having even lower spring rates would be more desirable at high rotary speeds. Although the present suppliers of shock subs have obviously taken substantially different views of the importance of low spring rates, Johnston-Schlumberger is quite proud of the spring rate of 35,000 pounds per inch of deflection in its helical spring type shock sub. It is accordingly apparent that low spring rate shock subs are deemed to be highly desirable by some segments of the industry.

Figure 2B:
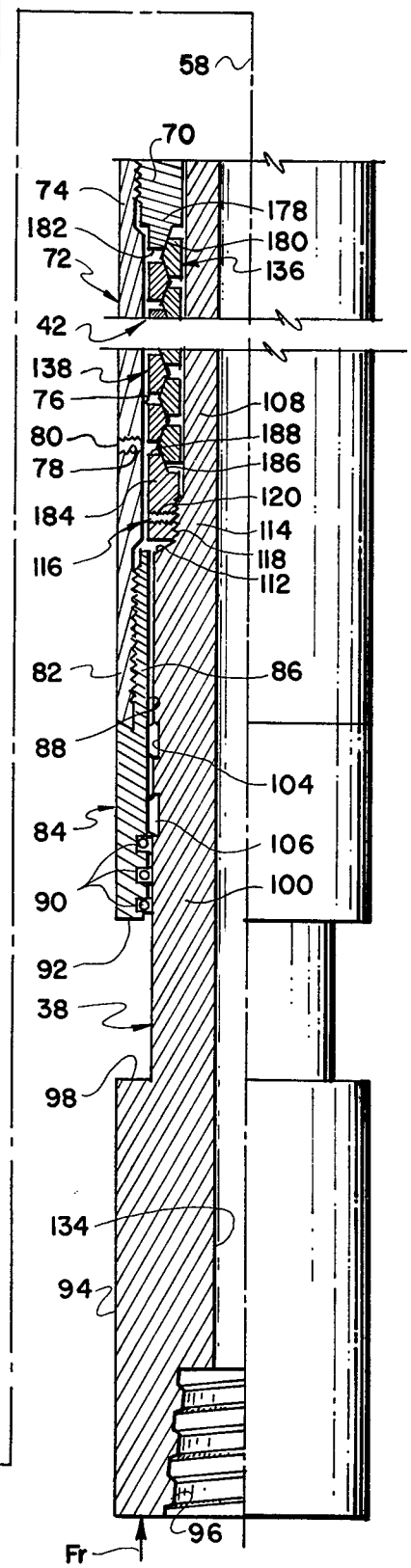
Figure 6:
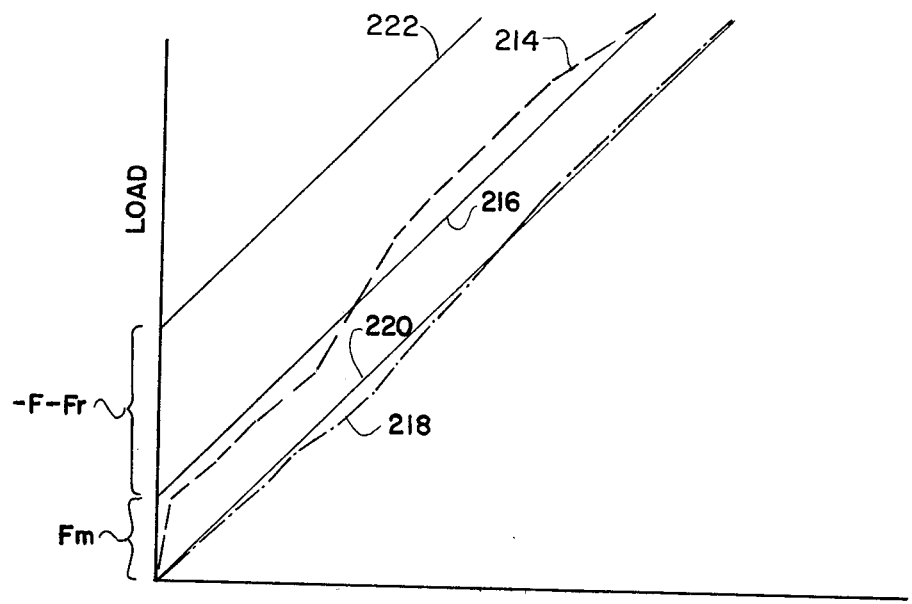
FIG. 6 is a load-deflection diagram of the tool of FIGS. 2A and 2B.

Referring to FIGS. 2A and 2B, there is illustrated the shock sub 28 of this invention. Broadly, the shock sub 28 comprises a barrel 36, a mandrel 38 telescopingly received in the barrel 36, means 40 for transmitting torque between the barrel 36 and mandrel 38, a spring assembly 42 for damping relative movement between the barrel 36 and mandrel 38, and means 44 for equalizing the fluid pressure around the spring assembly 42 with that inside the mandrel 38.

The barrel 36 may be of any suitable construction and is illustrated as comprising a plurality of connected threaded components including an upper body or washpipe barrel 46 having a female threaded connection 48 for attachment in the drill string 18, a central passage including a relatively small initial section 50 and an enlarged lower section 52. The lower end of the upper body 46 terminates in a threaded end 54. For purposes more fully apparent hereinafter, the upper body 46 also includes one or more threaded openings 56 transverse to the tool axis 58 which is closed by a threaded sealing plug 60.

The next section of the barrel 36 is a spline body 62 having an upper end 64 providing male threads engaged with the threaded end 54 of the upper body 46. The spline body 62 provides a central passage 66 sized to closely receive the mandrel 38 and provides a plurality of circumferentially spaced longitudinally or helically extending splines 68 extending interiorly of the passage 66. The spline body 62 terminates in a lower end 70 having male threads thereon.

The next section of the barrel 36 is a middle body 72 having an upper threaded end 74 engaged with the threads of the lower end 70 of the spline body 62. The middle body 72 provides a central passage 76 of substantially greater diameter than the passage 66 and one or more transversely extending passage 78 having a threaded sealing plug 80 therein. The body 72 terminates in a lower threaded end 82.

The barrel 36 terminates in a packing nut 84 having an upper threaded end 86 engaged with the threads of the middle 72. The packing nut 84 provides an internal passage 88 sized to closely receive the mandrel 38 and is intermediate in diameter to the passages 66, 76. The lower terminal end of the packing nut 84 provides a plurality of recesses each of which receives an annular packing member 90. A surface 92 perpendicular to the tool axis 58 constitutes the end of the packing nut 84.

The mandrel 38 includes an enlarged lower end 94 having a female threaded connection 96 in the end thereof for attachment to the drill string 18. Because the shock sub 28 has female connections at its opposite ends, it can be connected between the bit 16 and lowermost drill collar 30 without requiring the use of an adapter sub. The lower end 94 terminates in a shoulder 98 facing the barrel 35 which is perpendicular to the tool axis 58. It will be seen that the maximum travel between the barrel 36 and mandrel 38, in a collapsing or telescoping direction, is dictated by the spacing between the surface 92 and the shoulder 98.

The mandrel 38 also includes a mandrel body section 100 integral with the enlarged end 94 and includes a cylindrical external surface 102. One or more grooves 104 are cut in the surface 102 adjacent the packing nut 84 which receive a wear ring 106. The wear rings 106 are typically made of an organic polymeric material which is subject to being transferred to an adjacent metal surface by friction contact and which exhibits a low coefficient of friction. One exemplary material for the wear rings 106 is tetrafluoroethylene. During relative movement of the mandrel 38 and barrel 36, the material of the wear rings 106 is distributed onto the surface of the passage 88 and thereby acts to minimize or prevent scuffing of the surface 102 and the passage 88.

The body section 100 joins another mandrel body section 108 of reduced diameter having an external surface 110. The diameter of the cylindrical surface 100 is only slightly less than the diameter of the passage 66 of the spline body 62. It will be seen that there is provided an annular chamber between the internal passage 76 of the middle body 72 and the surface 110. Adjacent a shoulder 112, the mandrel body section 108 provides an exteriorly threaded section 114 which receives a mandrel nut 116 having female threads 118 engaging the threaded section 114. A set screw 120 extends through the mandrel nut 116 and acts to secure it in position.

The external surface 110 of the body section 108 provides, adjacent the spline body 62, a plurality of grooves 122 which are preferably longitudinally extending but which may be of helical shape, receiving the splines 68 of the spline body 62. It will be evident that the splines 68 and grooves 122 cooperate to provide the torque transmitting means 40 so that rotation of the barrel 36 results in rotation of the mandrel 38.

The upper extremity of the mandrel body section 108 includes a threaded end 124 receiving an internally threaded end 126 of a washpipe 128 comprising part of the mandrel 38. The lower end of the washpipe 128 includes a surface 130 perpendicular to the tool axis 58 and cooperates with a facing perpendicular surface 132 provided by the spline body 62 to limit expanding or untelescoping movement of the barrel 36 and mandrel 38.

A central passage 134 extends through the mandrel 38 from the top of the washpipe 128 through the threaded connection 96 and allows the delivery of drilling fluid from the passage sections 50, 52 through the end of the shock sub 28. As suggested previously, the passage 134 should be no smaller than about 1$\frac{1}{4}$" in diameter to allow the passage of drilling fluid without undue pressure loss and to allow a fishing spear to enter the washpipe 128 in the event the mandrel 38 becomes lost in the hole 10.

Figure 3:
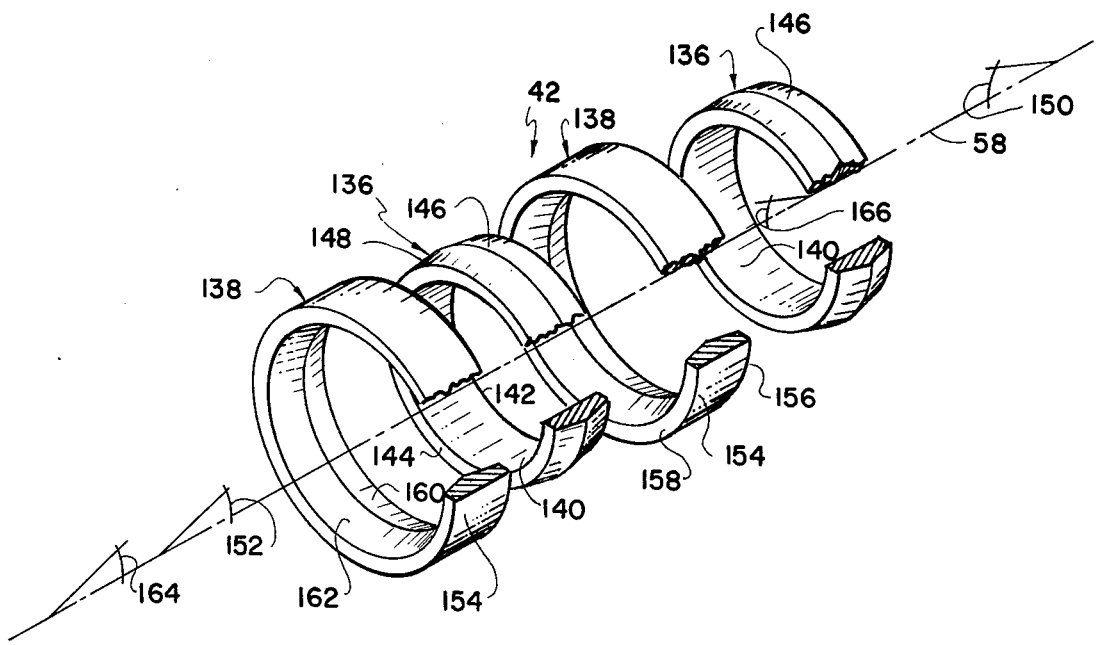
FIG. 3 is an exploded broken isometric view of the ring springs incorporated in the shock sub of FIGS. 2A and 2B.

Referring to FIGS. 2B and 3, the spring assembly 42 includes a plurality of inner annular ring springs 136 and a plurality of outer annular ring springs 138. The ring springs 136, 138 are alternately stacked in the chamber provided between the barrel 36 and the mandrel 38. As will be seen, telescoping or collapsing movement of the barrel 36 and mandrel 38 causes each of the springs 136, 138 to be stressed substantially only in a plane perpendicular to the tool axis 58. When stressed, the inner ring springs 136 are placed in compression while the outer ring springs 138 are placed in tension.

All of the inner ring springs 136 are desirably identical. Although the cross-sectional shape of the rings springs 136 may vary substantially as pointed out in the publications and patents relative to ring springs cited previously, in order to maximize the cross-sectional area of the inner ring springs 136 while maximizing the allowable external diameter of the body section 108, the inner ring springs 136 preferably comprise a radially inner cylindrical surface 140. The inner diameter of the surface 140, in either the unstressed or fully stressed condition of the ring springs 136, is larger than the diameter of the cylindrical surface 110. As will be more fully pointed out hereinafter, the maximum stress applied to the ring spring assembly 42 and consequently the maximum stress applied to each of the springs 136 is controlled by the amount of collapsing movement allowed by the spacing between the surfaces 92, 98.

The inner ring springs 136 also include upper and lower surfaces 142, 144 which are generally transverse to the tool axis 58 and which are preferably perpendicular thereto. The radially outer surface of the inner ring springs 136 includes a pair of surfaces 146, 148 which are frustoconical in configuration and which include a common maximum diameter. The surfaces 146, 148 define oppositely facing acute angles 150, 152 respectively with the tool axis 58. As will be more fully apparent hereinafter, it is preferred that the angles 150, 152 be substantially identical.

The outer ring springs 138 are also desirably identical. Although the outer ring springs 138 may also be of any suitable shape, in order to maximize the cross-sectional area in a plane including the tool axis 58, the ring springs 138 include a radially outer cylindrical surface 154. The diameter of the radially outer surface is less, in either the unstressed or fully stressed condition of the spring assembly 42, than the diameter of the passage 76 provided by the middle body 72.

The outer ring springs 138 include upper and lower surfaces 156, 158 which are transverse to the tool axis 58 and which are preferably perpendicular thereto. The radially inner surface of the outer ring springs 138 include a pair of surfaces 160, 162 which are frustoconical in configuration and which include a common minimum diameter. The surfaces 160, 162 define oppositely facing acute angles 164, 166 respectively with the tool axis 58.

If the angles 150, 152, 164, 166 are substantially identical, this will allow all of the inner ring springs 136 to be identical and all of the outer ring springs 138 to be identical. This is, of course, highly desirable when it is necessary to replace any of the springs 136, 138. In addition, this provides considerable simplicity in design and manufacture of the shock sub 28.

The design selection of the quantity for the angles 150, 152, 164, 166 is of substantial importance as is the cross-sectional area of the inner and outer ring springs 136, 138. The stress induced in the springs may be calculated from the equation $$S = (\text{Load}) \tan \alpha / \pi A K \tag{2}$$

where S is the maximum stress in each spring, A is the cross-sectional area of each individual spring, $\alpha$ is the angle 150, 152, 164, 166 and K is a constant of the system and is a function of $\alpha$. Thus, in order to provide for the maximum load induced in each spring, the cross-sectional area A should be maximized. In addition, the cross-sectional areas of the springs 136, 138 are desirably identical. The value of K may be obtained from the equation provided in the publication of Wahl cited previously. The maximum value for the angles 150, 152, 164, 166 can be obtained from equation (2) because the maximum value of S is a function of the material of the springs 136, 138 and the load value is dictated by the desired capacity of the shock sub 28. It may be, however, that one may wish to select a smaller value for $\alpha$ because the spring rate of each individual spring will generally decrease as the value of $\alpha$ decreases. In general, the value of $\alpha$ in shock subs of this invention will lie in the range of 5°–20° and a preferred range is on the order of 11°–15°.

One of the oddities of ring spring assemblies lies in the relationship between the number of springs and the spring rate of the assembly. Because the weight applied by the drill collars 30 to the barrel 36 is transmitted through each of the ring springs 136, 138, it will be seen that each spring is subjected to the entire applied load. Accordingly, $$SR_a = \text{Load}/(D_s) (n) \tag{3}$$

where $SR_a$ is the spring rate of the assembly, $D_s$ is the deflection of each individual spring and n is the total number of springs. Because the design load remains the same, the deflection of each spring in an axial direction will remain the same, independently of the number of springs employed, because the amount of each deflection of each spring is directly related to the applied load. Thus, the spring rate of the assembly 42 may be modified merely by changing the number of springs in the assembly 42. This has two significant aspects. First, in the design of this shock sub the desired spring rate can be achieved merely by selecting the number of springs. Second, the spring rate of an existing shock sub can be increased by replacing some of the springs with a spacer or can be decreased by removing a spacer from the spring chamber and replacing it with operative springs.

In this regard, FIG. 4 illustrates an annular spacer 168 of reactangular cross-section positioned between the lower face 170 of a spline body 172. A ring spring assembly 172 is provided with a half spring 174 abutting the spacer 168 and engaging the first full spring 176 of the assembly 172. It will be evident that a shock sub of this invention may be designed to normally incorporate the spacer 168 so that the spring rate of the tool may be decreased merely by removing the spacer 168 and half spring 174, placing a number of operative full springs in the spring chamber and replacing the half spring 174. In the alternative, the spring rate of the sub 28 may be increased by replacing several of the springs 136, 138 with the spacer 168 and half spring 174.

There are a variety of suitable techniques for stressing the assembly 42 in response to telescoping movement of the barrel 36 and mandrel 38 in addition to the showing of FIG. 4. One exemplary technique is illustrated in FIGS. 2A and 2B where a first projection 178 is integral with the lower end 70 of the spline body 62 and provides an inclined surface 180 of the same angle as the surface 162. The surface 180 engages the radially outer surface 146 of the uppermost inner ring spring 136. The projection 168 also includes a terminal face 182 perpendicular to the tool axis 58 and is comparable to the surface 158. The mandrel nut 116 also provides a projection 184 having an inclined surface 186 comparable to the surface 160 and engages the surface 148 of the lowermost ring spring 136. The projection 184 provides an end surface 188 perpendicular to the tool axis 58.

Another exemplary technique is illustrated in FIG. 5 where a spline body 190 includes a lower face 192 perpendicular to the tool axis and engaging a half spring 194 providing an inclined surface 196 engaging the apropriate inclined surface 198 of the uppermost full spring 200. Although not illustrated, the mandrel nut facing the spline body may be of similar configuration abutting a similar half spring. It will be noted that the showings of FIG. 4 and 5 are substantially identical except for the provision of the spacer 168.

Referring back to FIG. 2A, the pressure equalizing means 44 includes a floater 204 of annular construction having an internal diameter sized to slide closely on the external surface of the washpipe 128 and an external diameter sized to slide closely on the wall of the passage section 52. The floater 204 is preferably made of organic polymeric material, such as Ryton, and provides one or more interior annular grooves receiving a packing member 206 and one or more external annular grooves receiving a packing member 208. A floater stop 210 provides one limit of sliding movement of the floater 204 and a shoulder 212 on the washpipe 128 provides another limit of travel.

The function of the floater 204 is to equalize the pressure in the spring chamber with the pressure inside the shock sub 28. This is accomplished because the floater 204 moves downwardly upon increase the hydrostatic pressure inside the mandrel to increase the pressure in the spring chamber or moves upwardly when the hydrostatic pressure inside the mandrel declines. This has two effects. First, the pressure differentials sensed by the seals 206, 208 and the packing members 90 will be substantially reduced. Second, there would be a tendency for the mandrel 38 and barrel 36 to lock up hydraulically because the spring chamber is filled with a lubricant and because the spring chamber is variable in size depending on the relative position of the barrel 36 and mandrel 38. It will be seen that the floater 204 resolves these difficulties in a simple and expeditious manner.

In order to fill the spring chamber with a lubricant, one of the sealing plugs 60, 80 may be removed and a liquid lubricant poured therethrough. In order to prevent the accumulation of air in the lubricant filled annulus between the mandrel 38 and barrel 36, both sealing plugs 60, 80 may be removed, lubricant pumped into the lower of the openings 56, 78 while allowing air to discharge from the other opening and periodically tilting the sub 28.

One of the features of the shock sub 28 which is not immediately apparent is that the maximum deflection allowed by the spacing between the shoulders 92, 98 is selected to be related to the maximum permissible deflection of the spring assembly 42 which is related to the maximum permissible deflection of each of the ring springs 136, 138. The maximum permissible deflection of each spring 136, 138 may be calculated from the teachings of Hicks and Wahl, supra, and is a function of the elastic limit of the material selected. The maximum deflection of the spring assembly 42 is, of course, the maximum deflection of each spring multiplied by the number of springs. This distance is then selected for the spacing between the shoulders 92, 98. Thus, the spacing between the shoulders 92, 98 is selected so that the mandrel 38 and barrel 36 bottom out before the elastic limit of the springs is reached.

When the shock sub 28 is utilized in the drill string 18, the bit 16 is desirably threaded into the screw connection 96 of the mandrel 38 and the lowermost drill collar 30 is threaded into the screw connection 48 of the barrel 36. When drilling mud, for example, is pumped down the drill string 18, there is created a pump open Force F acting on the mandrel 38 which tends to untelescope the mandrel 38 and barrel 36. The amount of the pump open force F is readily calculated by multiplying the unbalanced areas of the mandrel 38 by the pressure acting thereon. Another force acting on the shock sub 28 during drilling is a reaction force $F_r$, usually called bit thrust, caused by passage of the drilling fluid through the nozzles of the bit 16. In order to stress the spring assembly 42, the weight applied by the drill collars 30 must exceed the pump open force F less the bit thrust $F_r$. Normally, the pump open force F is greater than the bit thrust $F_r$. Thus, the spring assembly 42 is not stressed until a significant amount of weight is placed on the barrel 36. The difference between the pump open force F and the bit thrust $F_r$ can be considered to be a base line or threshold in the sense that the weight of the drill collars equal to this value must be applied to the shock sub 28 before the damping characteristics of the spring assembly 42 are brought into play.

As sufficient weight is applied to the barrel 36, the ring springs 136, 138 are stressed to transmit the applied load to the mandrel 38 and consequently to the bit 16. As the bit 16 is rotated on the bottom of the hole 10, the oscillations induced in the mandrel 38 are damped during transmission through the spring assembly 42 to the barrel 36.

A shock sub in accordance with the principles of this invention has been constructed to accommodate a nominal load of 50,0000 pounds and has a maximum deflection of 4⅜". The spring assembly 42 comprises twenty inner ring springs 136 and twenty outer ring springs 138. The unstressed height of the spring assembly 42 is about twenty five inches. The tool is 6⅝" in outer diameter and provides an internal passage 134 of 1¾" in diameter. The sub is about eight feet long.

One of the advantageous features of the shock sub 28 is its short length. It will be apparent that the stability of the lower end of the drill string 18 is promoted by a short shock sub. Thus, the shock subs of this invention are characterized by a relatively short length, usually under ten feet long and preferably about eight feet long.

The contructed tool was placed in a jar testing press so that various loads could be applied thereto and the displacement of the barrel 36 relative to the mandrel 38 measured. In the test setup employed, no hydrostatic pressure was applied to the interior of the mandrel 38 so that the pump open force F was not created nor was drilling fluid discharged through a bit nozzle so that the bit thrust $F_r$ was not created.

In theory, the load applied to the barrel 36 should immediately cause relative movement between the barrel 36 and mandrel 38. As a matter of practicality, there may be a certain amount of friction generated in the spring assembly 42 and there may be required a minimum application force $F_m$ to center the ring springs 136, 138 and commence stressing thereof, at least during initial or break in runs of the sub 28. Part of this minimum application force $F_m$ is required to overcome friction and part is a result of manufacturing tolerances.

The spring rate of the constructed tool was designed to be 12,500 pounds per inch of deflection. Data obtained from the first test generated a load-deflection curve 214 which was substantially linear over the test range of 0–50,000 pounds as shown by comparison with the line 216 even though the spring rate differed slightly from the design value. A second test, incorporating improved deflection measuring techniques, generated a load-deflection curve 218 which compared very favorably with the line 220 representing a spring rate of 12,500 pounds per inch of deflection. It is not yet clear whether the difference between the curves 214, 218 is a function of improved measurement during the tests or whether it relates to a breaking in of the shock sub.

It will be evident that the spring rate of the constructed tool, which is the slope of the line 218, was remarkably constant throughout the load test range of 0–50,000 pounds. Accordingly, when used in a drill string, the spring assembly will begin to stressed at a load value of $F_m + F - F_r$ and will thereafter exhibit a load deflection curve 222. It is conceivable, of course, that $F_m$ is quite small as suggested by the curve 218.

One of the peculiarities of the shock sub 28 is that it may be attached in the drill string 18 with the mandrel end 94 facing upwardly rather than downwardly. The effect of this bidirectionality of the shock sub 28 requires some discussion of pump open forces generated during drilling. It is a common teaching in the art that the amount of the pump open force is determined by the pressure in a shock sub which acts on unbalanced areas and tends to untelescope the tool. In shock subs of the prior art and in the shock sub 28 when the mandrel end 94 is run down, i.e. facing toward the bit, an amount of weight from the drill collars equal to the pump open force must be applied to the barrel in order to commence stressing of the spring assembly.

When the shock sub 28 is inverted, i.e. the mandrel end 94 faces the drill collars 30, the direction of the pump open force is changed and a much smaller amount, if any, of weight from the drill collars 30 must be applied to the mandrel in order to commence stressing of the spring assembly 42. In this situation, the pump open force is acting in a direction opposite to the bit thrust $F_r$ rather than in the same direction. It is conceivable, of course, that with the shock sub 28 inverted, the pump open force could be nil or zero depending on the amount of unbalanced areas inside the shock sub 28 when it is inverted. With the sub 28 inverted, the threshold force tending to stress the spring assembly 42 is reduced. This is of considerable importance at any time the load to be applied to the bit 16 is less than about half the load capacity of the spring assembly 42 when the shock sub 28 is normally oriented. In other words, a lower amount of weight applied by the drill collars 30 begins stressing the spring assembly 42 with the mandrel end 94 up than with the mandrel end 94 down. An exemplary situation where this is of value is in drilling at very shallow depths where only a few drill collars 30 can be placed in the hole 10. In this situation, very little weight can be applied to the bit 16. Accordingly, it is advantageous to drill the surface hole with the sub 28 inverted to take advantage of the lower spring threshold and increased sensitivity and then drill the remainder of the hole with the mandrel end 94 down as shown in FIG. 1. Other circumstances where it is desirable to invert the sub 28 will be recognizable by those skilled in the art.

Referring to FIG. 7, there is illustrated another embodiment of the invention comprising a ring spring assembly 224 including inner and outer ring springs 226, 228 and a mandrel nut 230 secured in a unit handled mass by an annular sleeve 232 of permeable material such as nylon net or permeable butyl rubber. Inside the sleeve 232, the individual ring springs 226, 228 define gaps therebetween which are substantially filled by a porous and permeable foam material 234. The sleeve 232 and material 234 are sufficiently permeable to pass lubricant toward and away from the springs 226, 228. It will be seen that the springs 226, 228 are capable of being unit handled along with the mandrel nut 230 if desired.

Although this invention has been described in conjunction with a conventional rotary drilling technique in which the drill string 18 is rotated at the surface, shock subs in general and the shock sub of this invention in particular are quite desirable for use with down hole powered drills in which the bit is turned by a motor suspended in the hole by a drill string which is not normally rotated at the surface. Typical down hole motors of this type are the turbine variety and the drill is known as a turbodrill.

Although the invention has been described in its preferred form with a certain degree of particularity, it is understood that the present disclosure of the preferred form is only by way of example and that numerous changes in the details of construction and the combination and arrangement of parts may be resorted to without departing from the spirit and scope of the invention as hereinafter claimed.

I claim:

1. A shock sub for connection in a drill string, comprising:
    a barrel having means at one end for connection to the drill string;
    a mandrel mounted in the barrel for telescoping movement along a longitudinal axis, having means at one end for connection to the drill string, and defining with the barrel a spring receiving chamber;
    means for transmitting torque between the barrel and mandrel;
    a ring spring assembly in the chamber for damping relative movement of the mandrel and barrel, the assembly comprising:
    a multiplicity of inner and outer annular ring springs residing in planes transverse to the axis,
    the inner ring springs comprising radially outer surfaces inclined to the axis,
    the outer ring springs comprising radially inner surfaces inclined to the axis and engaging the radially outer surfaces of the inner ring springs,
    the assembly exhibiting a substantially constant spring rate of less than 25,000 pounds per inch of deflection and a load capacity of between 10,000–125,000 pounds;
    means carried by the mandrel and the barrel for expanding the outer ring springs and compressing the inner ring springs upon collapsing movement of the barrel and mandrel;
    a liquid lubricant in the chamber; and
    means sealing the chamber throughout the range of telescoping movement of the barrel and mandrel.

2. The shock sub of claim 1 wherein the overall length of the shock sub, in an unstressed condition of the spring assembly, is not greater than about ten feet.

3. The shock sub of claim 1 wherein the spring rate of the spring assembly is less than about 15,000 pounds per inch of deflection.

4. The shock sub of claim 1 wherein the load capacity of the spring assembly is in the range of 30,000–75,000 pounds.

5. The shock sub of claim 1 wherein the barrel and mandrel comprise communicating passages providing a flow path through the shock sub and means providing a pump open force biasing the barrel and mandrel in an untelescoping direction in response to the delivery of pressurized fluid throught the flow path.

6. The shock sub of claim 5 wherein the spring assembly exhibits a given spring rate and load capacity of given value and further comprising means for changing the spring rate of the assembly while maintaining the load capacity at the given value.

7. The shock sub of claim 6 wherein the chamber is of variable axial length depending on the relative position of the mandrel and barrel, the changing means comprising an insert in the chamber reducing the number of inner and outer ring springs therein, the insert being free of inclined surfaces engaging the inclined surfaces of the ring springs.

8. A shock sub for connection in a drill string, comprising:
a barrel having means at one end for connection to the drill string;
a mandrel mounted in the barrel for telescoping movement along a longitudinal axis and having means at one end for connection to the drill string;
means for transmitting torque between the mandrel and barrel;
a ring spring assembly for damping relative movement between the mandrel and barrel, the assembly comprising:
a multiplicity of inner and outer annular ring springs residing in planes transverse to the axis;
the inner ring springs comprising radially outer surfaces inclined to the axis;
the outer ring springs comprising radially inner surfaces inclined to the axis and engaging the radially outer surfaces of the inner ring springs;
means carried by the mandrel and barrel for expanding the outer ring springs and compressing the inner ring springs upon collapsing movement of the mandrel and barrel;
the ring springs reaching the yield point of the material thereof at a predetermined amount of collapsing movement of the barrel and mandrel; and
means carried by the barrel and mandrel for limiting the amount of collapsing movement therebetween to less than the predetermined amount.

9. A shock sub for connection in a drill string, comprising:
a barrel having means for connection to the drill string;
a mandrel mounted in the barrel for relative telescoping movement along a longitudinal axis and having means at one end for connection to the drill string;
means for transmitting torque between the mandrel and barrel;
a ring spring assembly for damping relative movement between the mandrel and barrel, the assembly comprising:
a multiplicity of inner and outer annular ring springs residing in planes transverse to the axis;
the inner ring springs comprising radially outer surfaces inclined to the axis;
the outer ring springs comprising radially inner surfaces inclined to the axis and engaging the radially outer surfaces of the inner ring springs;
means mounting the springs in a unit handled body; and
means carried by the mandrel and barrel for expanding the outer ring springs and compressing the inner ring springs upon collapsing movement of the mandrel and barrel.

10. The shock sub of claim 9 wherein the mounting means includes a permeable sleeve supporting the ring springs.

11. The shock sub of claim 9 wherein the mounting means includes a permeable resilient material bonded to adjacent springs.

12. The shock sub of claim 11 wherein the mounting means includes a permeable sleeve supporting the ring springs.

13. A method of drilling a hole in the earth using a drill string comprising a bit, a shock sub, a plurality of drill collars and a string of drill pipe, the shock sub including a barrel; a mandrel mounted in the barrel for telescoping movement along a longitudinal axis; a ring spring assembly for damping relative movement of the mandrel and barrel, the assembly comprising a multiplicity of inner and outer annular ring springs residing in planes transverse to the axis, the inner ring springs comprising radially outer surfaces inclined to the axis, the outer ring springs comprising radially inner surfaces inclined to the axis and engaging the radially outer surfaces of the inner ring springs, the assembly exhibiting a spring rate of less than 25,000 pounds per inch of deflection and a load capacity of between 10,000–125,000 pounds; and means carried by the mandrel and barrel for expanding the outer ring springs and compressing the inner ring springs upon collapsing movement of the mandrel and barrel, the method comprising:
applying a load to the bit in the range of 10,000–125,000 pounds;
maintaining the neutral point of the drill string substantially above the shock sub;
causing the mandrel and barrel to telescope relative to one another in both inward and outward telescoping directions during load application and bit rotation; and
damping oscillations induced in the drill string in both inward and outward telescoping directions by changing the stresses induced in the ring spring assembly.

14. The method of claim 13 wherein the damping step comprises alternately stressing and relaxing the inner and outer ring springs in a plurality of generally parallel planes transverse to the axis.

15. The method of claim 11 further comprising the step of maintaining the inclined surfaces of the inner and outer ring springs continually in engagement with each other.

16. A method of using a shock sub of the type comprising a barrel having a passage therein, a mandrel mounted in the barrel for telescoping movement along a longitudinal axis and having a passage communicating with the barrel passage providing a flow path through the shock sub; means for transmitting torque between the mandrel and barrel; a spring assembly positioned relative to the barrel and mandrel for damping relative movement therebetween; and means responsive to the application of fluid pressure along the flow path creating a pump open force biasing the mandrel and barrel in an untelescoping direction for stressing the spring assembly; the method comprising:

drilling a hole in the earth with a drill string including a bit having nozzles therein, the shock sub, a plurality of drill collars and drill pipe wherein the shock sub is oriented with the mandrel end facing toward the drill collars and passing drilling fluid through the flow path to generate the pump open force and passing the drilling fluid through the bit nozzles to generate a bit thrust, the directions of the bit thrust and the pump open force being in a first relationship; and drilling a hole in the earth with a drill string including a bit having nozzles therein, the shock sub, a plurality of drill collars and drill pipe wherein the shock sub is oriented with the mandrel end facing toward the bit and passing drilling fluid through the flow path to generate the pump open force and passing the drilling fluid through the bit nozzles to generate a bit thrust, the direction of the bit thrust and the pump open force being in a second relationship.

17. The method of claim 16 wherein the first and second mentioned drilling steps are conducted in the same hole.

18. The method of claim 17 wherein the first mentioned drilling step is conducted at a shallower depth than the second mentioned drilling step.

19. A method of using a shock sub of the type comprising a barrel having a passage therein, a mandrel mounted in the barrel for telescoping movement along a longitudinal axis and having a passage communicating with the barrel passage providing a flow path through the shock sub; a spring assembly positioned relative to the barrel and mandrel for damping movement therebetween; and means responsive to fluid pressure in the flow path for generating a pump-open force in a direction related to the orientation of the shock sub, the method comprising:

drilling a hole in the earth with a drill string including a bit having nozzles therein, a shock sub, a plurality of drill collars and drill pipe, passing drilling fluid through the path to generate the pump-open force and passing the drilling fluid through the bit nozzles to generate a bit thrust, the shock sub being oriented so that the pump-open force is in the same direction as the direction of bit thrust.

20. A drill string for drilling a hole in the earth, comprising in an interconnected torque transmitting string:
    a rotatable bit;
    a multiplicity of drill collars;
    a multiplicity of joints of drill pipe; and
    a shock sub, located in the string substantially below the neutral point thereof, including:
        a barrel and a mandrel mounted in the barrel for telescoping movement along a longitudinal axis;
        means for transmitting torque between the barrel and mandrel;
        a ring spring assembly for damping oscillations in the drill string, the assembly including:
            a multiplicity of inner and outer annular ring springs residing in planes transverse to the axis;
            the inner ring springs comprising radially outer surfaces inclined to the axis;
            the outer ring springs comprising radially inner surfaces inclined to the axis and engaging the radially outer surfaces of the inner ring springs;
            the assembly exhibiting a substantially constant spring rate of less than 25,000 pounds per inch of deflection and a load capacity of between 10,000–125,000 pounds; and
        means carried by the mandrel and barrel for expanding the outer ring springs and compressing the inner ring springs upon collapsing movement of the barrel and mandrel.

21. The drill string of claim 20 wherein all of the drill collars are above the shock sub.

* * * * *